July 15, 1958  M. VLTAVSKY  2,843,093
VALVE MEANS AND CONTROL THEREFOR FOR FLUID MOTORS
Filed Aug. 16, 1955  2 Sheets-Sheet 1

INVENTOR.
Milan Vltavsky

July 15, 1958 M. VLTAVSKÝ 2,843,093
VALVE MEANS AND CONTROL THEREFOR FOR FLUID MOTORS
Filed Aug. 16, 1955 2 Sheets-Sheet 2

INVENTOR
MILAN VLTAVSKY

BY

United States Patent Office 2,843,093
Patented July 15, 1958

2,843,093

VALVE MEANS AND CONTROL THEREFOR FOR FLUID MOTORS

Milan Vltavský, Bratislava, Czechoslovakia, assignor to ČKD, Česká Lípa, národní podnik, Ceska Lipa, Czechoslovakia Application August 16, 1955, Serial No. 528,794

2 Claims. (Cl. 121—46.5)

In hydraulic presses for various purposes, more particularly in welding presses and resistance welding machines, it is necessary to provide a control mechanism which in addition to controlling the normal working and return strokes of the piston acts also to slow down the piston movement before the seating of the tool during the working stroke or stops the piston in any required position during its return stroke or movement.

Heretofore, slowing down of the piston movement during its working stroke has been brought about by throttling the feed of the pressure liquid into the working cylinder or by throttling the discharge of the pressure liquid from the space in the working cylinder at the side of the latter facing in the direction of movement of the piston. In both cases such throttling action resulted in a rise of the pressure in the feeding pressure fluid to the working cylinder and consequently in higher losses of power.

Stoppage of the piston movement during its return stroke has been brought about, in general, by setting a distributing valve in its rest position by means of suitable abutments.

The object of the present invention is to provide a control mechanism wherein all the aforesaid functions are united and which at the same time permits an automatic pressure reduction to be obtained on slowing down of the piston movement.

Figure 1:
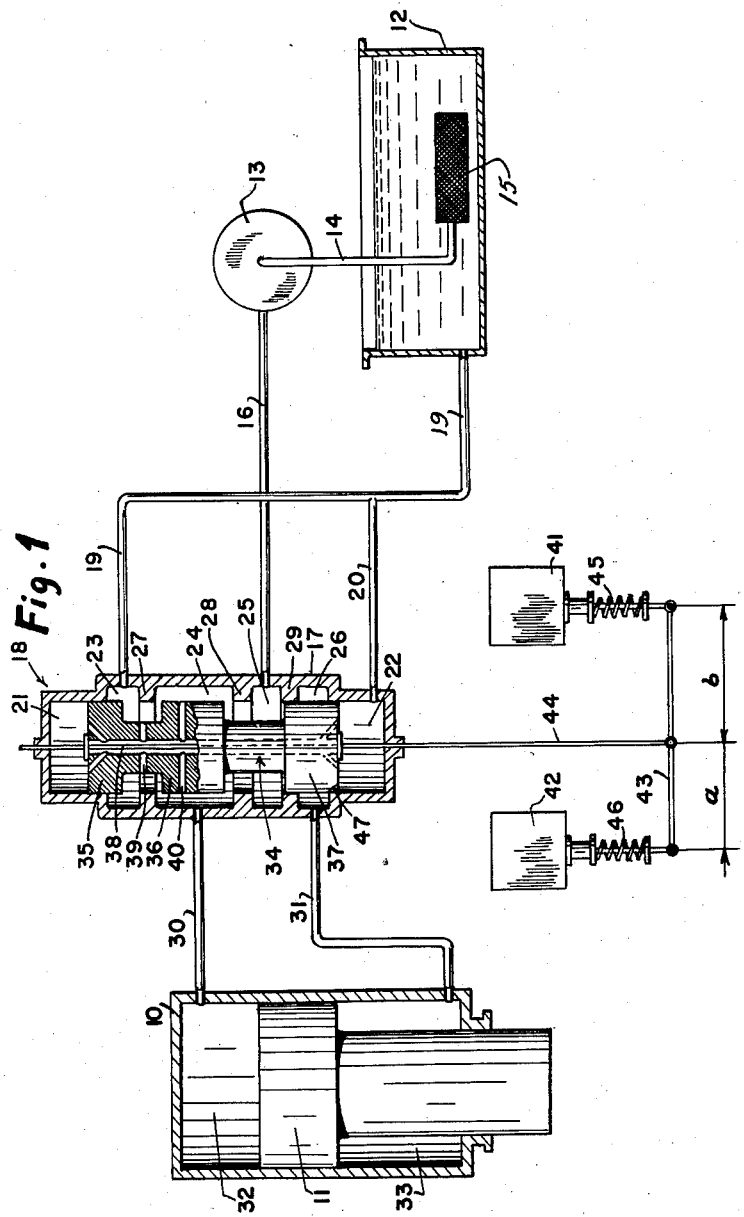

The above, and other objects, features and advantages of this invention, will be apparent in the following detailed description of an illustrative embodiment thereof which is to be read in connection with the accompanying drawings, wherein:

Fig. 1 is a schematic view, partly in section, of a control system for supplying pressure liquid to the working cylinder of a hydraulic press in accordance with the present invention; and Figs. 2 to 5, inclusive, are enlarged sectional views of a slide valve included in the system of Fig. 1 and shown in various operating positions.

Referring to Fig. 1 of the drawings in detail, it will be seen that the illustrated control system for regulating the supplying of pressure liquid to a working cylinder 10 having a working piston 11 reciprocable therein includes a tank or reservoir 12 containing hydraulic fluid.

A pump 13 has its inlet connected to a conduit 14 which extends into the reservoir 12 and has a strainer 15 at the end opening in the reservoir. The outlet or discharge side of pump 13 is connected to a feed conduit 16 which opens into the body or housing 17 of a distribution control slide valve 18 at a location intermediate the opposite ends of the housing. Return conduits 19 and 20 extend from opposite end portions of housing 17, and the conduit 20 is connected to conduit 19 which extends back to reservoir 12.

The interior of slide valve housing 17 has reduced diameter end compartments 21 and 22 and successive, relatively large diameter compartments 23, 24, 25 and 26 between the end compartments and separated by successive, annular, inwardly directed rims 27, 28 and 29 which have internal diameters equal to the internal diameter of the end compartments. It will be seen that feed conduit 16 opens into compartment 25, while return conduits 19 and 20 extend from compartments 23 and 22, respectively. Further, conduits 30 and 31 extend from compartments 24 and 26 of the slide valve housing 17 and open into interior spaces 32 and 33, respectively, of the working cylinder 10 above and below piston 11.

The slide valve 18 further includes a slide valve member 34 which is axially reciprocable in housing 17. Slide valve member 34 has upper, intermediate and lower diametrically enlarged portions 35, 36 and 37, respectively, spaced apart along the length thereof, and the slide valve member further has an axial bore 38 which opens at the opposite end faces of the valve member and which communicates with diametrical by-pass ports or passages 39 and 40 opening between enlarged portions 35 and 36 and at the outer surface of portion 36, respectively.

According to the present invention, the distribution control slide valve 18 is controlled by two electromagnets or solenoids 41 and 42 with the aid of a double-armed lever 43. The lever 43 is pivotally connected, at its opposite ends to the armatures of solenoids 41 and 42, respectively, while an activating rod 44 extending from valve member 34 is pivotally connected to lever 43 intermediate the ends of the latter. The ratio of the lengths of the arms $a$ and $b$ of lever 43 is chosen so that with full, constant and equal strokes of the armatures of solenoids 41 and 42, the slide valve member 34 assumes the several working positions described below, or the strokes of the electromagnets can differ and then the lever 43 can be equal-armed.

The slide valve member 34 is urged to its lowermost position by two springs 45 and 46 acting on the armatures of solenoids 41 and 42. The by-pass ports 39 and 40 in the valve member 34 have a cross sectional area of such dimensions that with a rate of flow determined by the output of the pump a pressure reduction to the requisite value takes place when the slide valve is placed in a "slow down" position. By such an arrangement, four working positions of the slide valve are possible, as indicated in Figs. 2 to 5, respectively.

Figure 2:
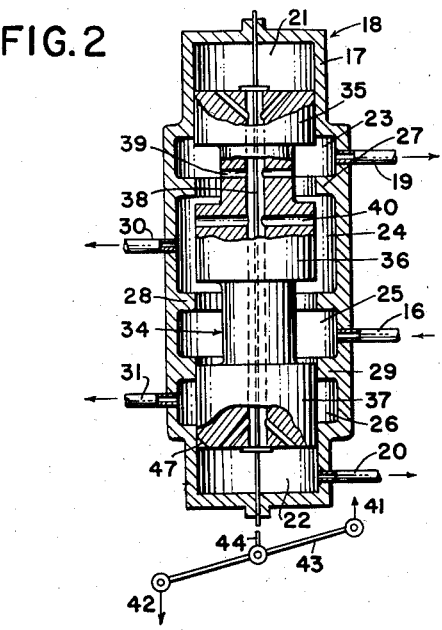

When the electromagnet 41 is energized and the electromagnet 42 is deenergized, the unequal lengths of the arms of the lever 43 cause the slide valve member 34 to move to a first position within the housing 17, as shown in Fig. 2. With the slide valve member 34 in the position of Fig. 2, the enlarged portion 37 thereof extends across the compartment 26 of valve housing 17, and thereby blocks the conduit 31 extending to the space 33 below piston 11 in working cylinder 10. Further, with the slide valve member 34 in the position of Fig. 2, the upper edge of the enlarged portion 36 of the valve member is disposed below the partition 27 between compartments 23 and 24, thereby to permit communication between such compartments so that conduit 30 which extends from the space 32 of cylinder 10 above piston 11 communicates with the return line 19 extending back to reservoir 12. It will also be seen that, with the slide valve member 34 in the position of Fig. 2, the lower edge of enlarged portion 36 is spaced upwardly from the partition 28 between compartments 24 and 25, thereby to permit direct communication between such compartments, so that the pressure liquid entering compartment 25 through conduit 16 can flow through compartment 24 into compartment 23 for return to the reservoir by way of the return conduit 19. Thus, when solenoid 41 is energized and solenoid 42 is deenergized, the distribution control slide valve 18 is in condition to stop downward movement of piston 11 and to permit the pump 13 to operate against reduced resistance by reason of the circulation of the pressure liquid through the slide valve, as described above, for return to reservoir 12.

Figure 3:
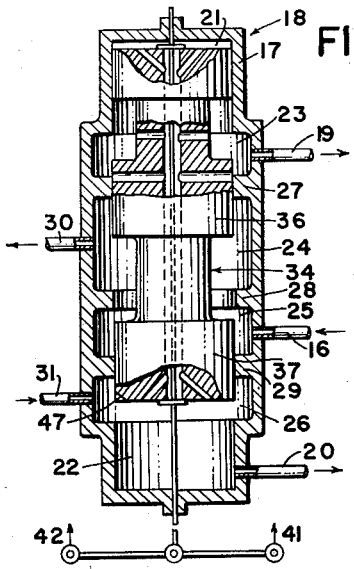

When both electromagnets or solenoids 41 and 42 are energized, as in Fig. 3, the slide valve member 34 is displaced to its uppermost position within the valve housing or body 17, so that its enlarged portion 36 extends into partition or rim 27 to isolate the compartments 23 and 24, while the enlarged portion 37 is disposed within the rim 29 with its upper end spaced downwardly from the rim 28 and with its lower end spaced upwardly from the end compartment 22. Thus, compartment 25, into which the feed conduit 16 opens, communicates with compartment 24 from which conduit 30 extends to the space 32 of cylinder 10 above piston 11, while compartment 26 into which opens the conduit 31 extending from the lower space 33 of cylinder 10 communicates with the end compartment 22 from which return line 20 extends back to the reservoir 12. Accordingly, the upper space 32 of cylinder 10 is supplied with pressure liquid at undiminished pressure, while the lower space 33 is communicated with the return or discharge, so that the position of the slide valve member illustrated in Fig. 3 corresponds to the downward movement of piston 11 at full speed.

Figure 4:
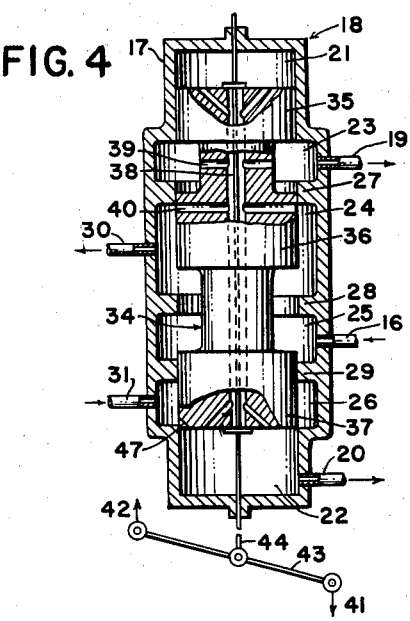

When the solenoid 42 is energized while the solenoid 41 is deenergized, as in Fig. 4, the different lengths of the arms of lever 43 causes the valve member 34 to assume a position different from that shown in Fig. 2, that is, when solenoid 41 is energized while solenoid 42 is deenergized. In the position of Fig. 4, the slide valve member 34 is disposed so that, while its enlarged portion 36 extends into the opening defined by rim 27 and thereby blocks direct communication between the compartments 23 and 24, the bypass ports or passages 39 and 40 open into the compartments 23 and 24, respectively, so that communication is established, to a limited extent, between compartments 23 and 24 by way of the passages 39 and 40 and the central bore 38 of the valve member. Further, with the valve member 34 in the position of Fig. 4, compartments 24 and 25 are in direct communication so that the pumped liquid entering compartment 25 can flow into compartment 24 and from the latter into conduit 30 extending to the upper space 32 of cylinder 10. Since compartment 24 also has limited communication with compartment 23, as described above, part of the pumped liquid can return to the reservoir 12 by way of return conduit 19, thereby to reduce the pressure of the liquid acting downwardly on piston 11. It will also be seen that, with valve member 34 in the position of Fig. 4, the enlarged portion 37 of the valve member spans compartment 26, but the extent of the insertion of enlarged portion 37 into lower end compartment 22 is sufficiently small so that an angled slot 47 cut in the lower end edge of valve member 34 provides limited communication between compartment 26 and end compartment 22. Thus, the conduit 31 extending from the lower space 33 of cylinder 10 into compartment 26 of valve housing 17 has limited communication with end compartment 22 from which the return conduit 20 extends back to reservoir 12, thereby to permit the slow downward movement of piston 11 in cylinder 10.

After the downward movement of piston 11 has been slowed by movement of valve member 34 to the position of Fig. 4, it may be desirable to then effect a pressing action under the full pressure developed by pump 13, and such action can be achieved by again energizing solenoid 41 while solenoid 42 remains energized, thereby to return valve member 34 to the position of Fig. 3 in which the full pressure of the pump liquid is exerted against the upper surface of piston 11.

Figure 5:
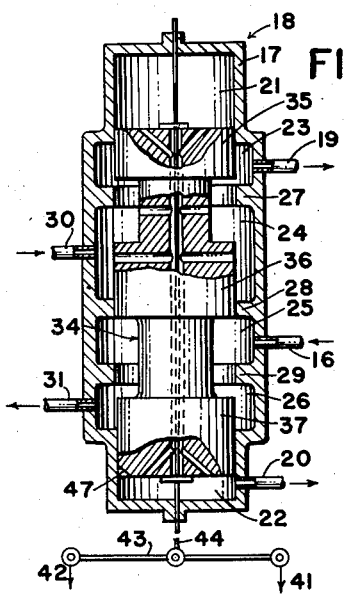

Following the completion of the pressing action or operation, it may be desirable to effect the rapid upward movement of piston 11. Such rapid upward movement of piston 11 is achieved by simultaneously deenergizing both solenoids 41 and 42 so that the springs 45 and 46 acting upon the related armatures can move the valve member 34 to its lowermost position, as illustrated in Fig. 5.

With valve member 34 in its lowermost position, the enlarged portion 36 thereof enters into the opening defined by rim 28, thereby to isolate compartment 24 from compartment 25 into which the feed conduit 16 opens. Further, the enlarged portion 36 has moved out of the opening defined by rim 27 so that direct communication is established between the compartments 23 and 24, thereby to permit liquid from conduit 30 connected to the upper space of cylinder 10 to flowback to the reservoir 12 by way of return conduit 19. At the same time, enlarged portion 37 of valve member 34 has moved into the lower end compartment 22 and out of the opening defined by rim 29, thereby to permit direct communication between compartments 25 and 26 so that pressure liquid entering through feed conduit 16 flows through conduit 31 to the lower space 33 of cylinder 10. Thus, the pressure liquid acts upwardly on piston 11 to effect the fast upward movement thereof.

Following the desired upward movement of piston 11, solenoid 41 can again be energized while solenoid 42 remains deenergized, as in Fig. 2, thus effecting the return of the slide valve member 34 to its stop position.

Although an illustrative embodiment of the invention has been described in detail herein with reference to the accompanying drawings, it is to be understood that the invention is not limited to that precise embodiment, and that various changes and modifications may be effected therein without departing from the scope or spirit of the invention, except as defined in the appended claims.

What I claim is:

1. A device for controlling the supplying of pressure fluid from a source of the latter to the opposite sides of a working piston within a cylinder of an hydraulic press; said device comprising a slide valve body having ports spaced apart therealong and adapted for connection to opposite ends of the cylinder, to the source of pressure fluid and to a discharge for the pressure fluid, respectively, a slide valve member movable longitudinally within said valve body through four different, longitudinally spaced apart control positions in which related control conditions of said ports are established, an actuating rod extending from said valve member out of said valve body, a lever member pivotally mounted, intermediate its ends, on said rod, two solenoids having movable armatures connected to the opposite, related ends of said lever member and being adapted to be energized alternately and simultaneously, and mechanical means acting yieldably on said lever member in the direction opposed to the actions of said solenoids when the latter are energized, the strokes of said movable armatures of the solenoids and the distances along said lever member between the connection of the latter to said rod and the connections of the lever member to said armatures, respectively, being proportioned to dispose said valve member in first and second extreme positions of said four positions when said solenoids are simultaneously energized and deenergized, respectively, and to dispose said valve member in third and fourth positions intermediate said first and second extreme positions when one and then the other of said solenoids, respectively, is individually energized, whereby said valve member can be disposed in any of said four positions by controlling the energization of said two solenoids.

2. A device as in claim 1; wherein said valve member is operative, in said first extreme position, to establish communication between the ports for connection to the source and to the cylinder at one side of the piston, respectively, and to establish communication between the ports for connection to the cylinder at the other side of the piston and to the discharge for pressure fluid, respectively; and, in said second extreme position, to establish communication between the ports for connection to the source and to the cylinder at said other side of the piston, respectively, and to establish communication between the ports for connection to the cylinder at said one side of the piston and to the discharge for pressure fluid, respectively; and wherein said valve member is operative, in said third and fourth positions, to block one of said ports for connection to the cylinder and, in said third position, further to generally isolate from each other said ports for connection to the source and to the discharge, respectively; said valve member having passageways therein establishing limited communication between said one port for connection to the cylinder and a port for connection to the discharge, and between the other of said ports for connection to the cylinder and said ports for connection to the source and discharge, respectively.

References Cited in the file of this patent

UNITED STATES PATENTS

| | | |
|---|---|---|
| 616,886 | Brinkmann | Jan. 3, 1899 |
| 1,795,896 | Schenck | Mar. 10, 1931 |
| 2,000,805 | West et al. | May 7, 1935 |
| 2,388,369 | Shendrick | Nov. 6, 1945 |
| 2,696,196 | Adams et al. | Dec. 7, 1954 |